US012614748B2

(12) United States Patent
Wang

(10) Patent No.: US 12,614,748 B2
(45) Date of Patent: Apr. 28, 2026

(54) ASSEMBLING APPARATUS

(71) Applicant: JIANGSU CONTEMPORARY AMPEREX TECHNOLOGY LIMITED, Jiangsu (CN)

(72) Inventor: Wenchong Wang, Jiangsu (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 682 days.

(21) Appl. No.: 18/153,333

(22) Filed: Jan. 11, 2023

(65) Prior Publication Data

US 2023/0178789 A1     Jun. 8, 2023

Related U.S. Application Data

(63) Continuation of application No. PCT/CN2022/082203, filed on Mar. 22, 2022.

(30) Foreign Application Priority Data

Apr. 13, 2021    (CN) .......................... 202110393092.4

(51) Int. Cl.
*H01M 10/04*         (2006.01)
(52) U.S. Cl.
CPC .............................. *H01M 10/0404* (2013.01)
(58) Field of Classification Search
CPC ......... H01M 10/0404; H01M 10/0481; H01M 50/209; Y02P 70/50; Y02E 60/10; Y10T 29/49108; Y10T 29/53135
See application file for complete search history.

(56) References Cited

U.S. PATENT DOCUMENTS

| | | | |
|---|---|---|---|
| 6,997,228 B2 * | 2/2006 | Hong ................ | H01M 10/0404 156/565 |
| 11,196,099 B2 * | 12/2021 | Cao ..................... | H01M 10/052 |

FOREIGN PATENT DOCUMENTS

| CN | 205159438 U | 4/2016 |
|---|---|---|
| CN | 106299454 A | 1/2017 |

(Continued)

OTHER PUBLICATIONS

International Search Report received in the corresponding International Application PCT/CN2022/082203, mailed Jun. 8, 2022.

(Continued)

*Primary Examiner* — Donghai D Nguyen
(74) *Attorney, Agent, or Firm* — K&L Gates LLP

(57)                ABSTRACT

An assembling apparatus is provided to assemble a battery module. The battery module includes at least two submodules. The assembling apparatus includes a working platform and a support mechanism. The support mechanism is installed on the working platform, and the support mechanism includes a first base, at least two first support assemblies, and a first drive component. The first base is disposed on the working platform. The at least two first support assemblies are spaced apart on the first base along a first horizontal direction and configured to support the submodules. The first drive component is connected to the first support assembly and configured to drive the first support assembly to move along the first horizontal direction. The assembling apparatus provided in this application can avoid relative friction between the submodule and the first support assembly and prevent an external insulating film of the submodule from being damaged.

20 Claims, 9 Drawing Sheets

(56)             References Cited

FOREIGN PATENT DOCUMENTS

| | | | |
|---|---|---|---|
| CN | 208507849 | U | 2/2019 |
| CN | 110328101 | A | 10/2019 |
| CN | 111987029 | A | 11/2020 |
| CN | 112310462 | A | 2/2021 |
| CN | 112803060 | A | 5/2021 |
| JP | 2007115719 | A | 5/2007 |

OTHER PUBLICATIONS

Written Opinion received in the corresponding International Application PCT/CN2022/082203, mailed Jun. 8, 2022.
First Office Action received in the corresponding Chinese Application 202110393092.4.
The extended European search report received in the corresponding European Application 22787339.5, mailed on Jun. 18, 2024.

\* cited by examiner

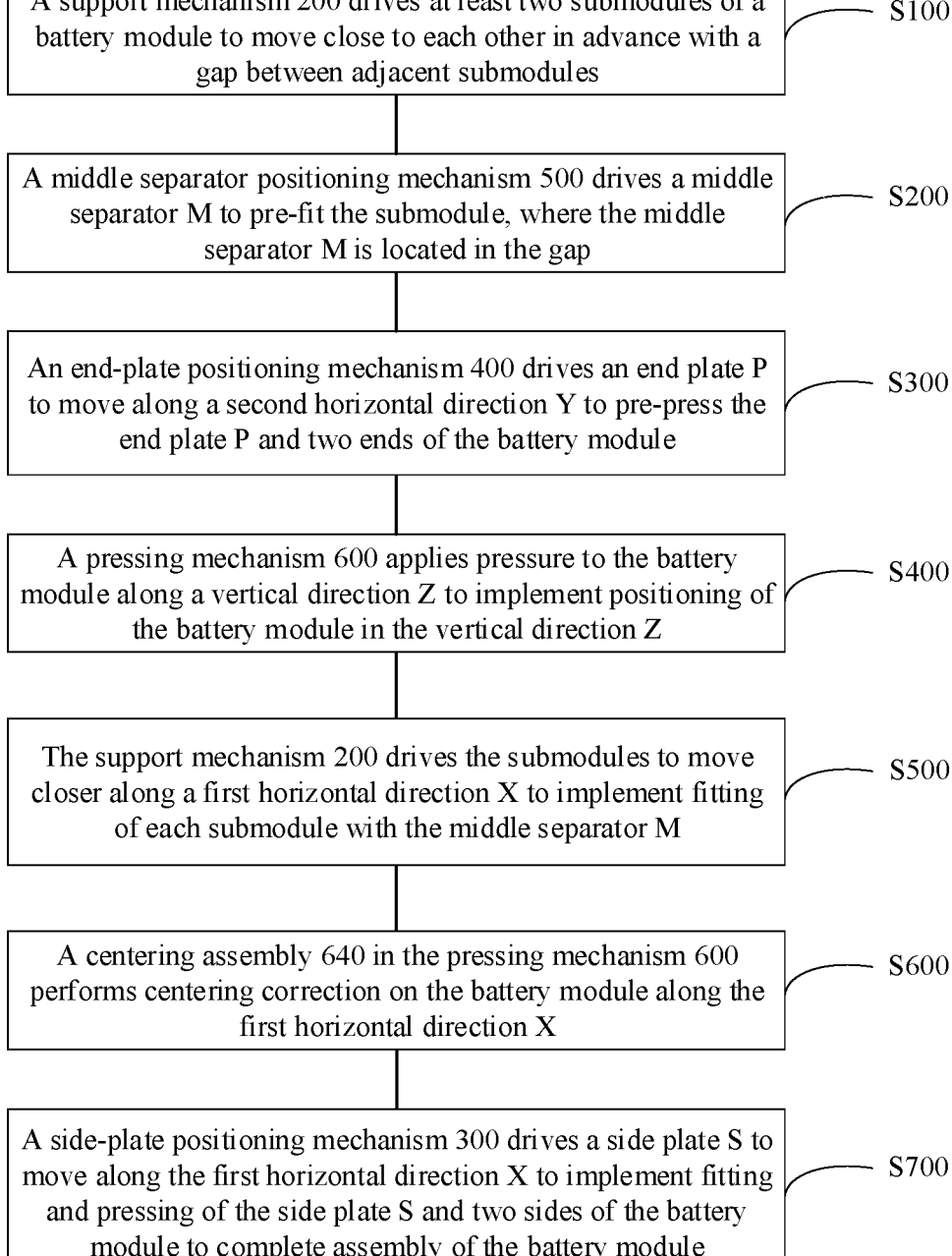

A support mechanism 200 drives at least two submodules of a battery module to move close to each other in advance with a gap between adjacent submodules — S100

A middle separator positioning mechanism 500 drives a middle separator M to pre-fit the submodule, where the middle separator M is located in the gap — S200

An end-plate positioning mechanism 400 drives an end plate P to move along a second horizontal direction Y to pre-press the end plate P and two ends of the battery module — S300

A pressing mechanism 600 applies pressure to the battery module along a vertical direction Z to implement positioning of the battery module in the vertical direction Z — S400

The support mechanism 200 drives the submodules to move closer along a first horizontal direction X to implement fitting of each submodule with the middle separator M — S500

A centering assembly 640 in the pressing mechanism 600 performs centering correction on the battery module along the first horizontal direction X — S600

A side-plate positioning mechanism 300 drives a side plate S to move along the first horizontal direction X to implement fitting and pressing of the side plate S and two sides of the battery module to complete assembly of the battery module — S700

FIG. 6

ASSEMBLING APPARATUS

CROSS-REFERENCE TO RELATED APPLICATIONS

This application is a continuation of International Application PCT/CN2022/082203, filed Mar. 22, 2022, which claims priority to Chinese Patent Application No. 202110393092.4, filed on Apr. 13, 2021 and entitled "ASSEMBLING APPARATUS", which is incorporated herein by reference in its entirety.

TECHNICAL FIELD

The present disclosure relates to the field of battery technologies, and in particular, to an assembling apparatus.

BACKGROUND

As a power battery has advantages of high specific energy, high power density, and the like, as a main energy source in the field of new energy, the power battery plays a very important and decisive role in the development of the field of new energy. A battery cell is a component unit of the power battery. Usually, a module composed of a plurality of battery cells is used as a battery module, and is applied in the field of new energy.

Currently, in an assembly process of assembling battery cells into a battery module, most operations need to be manually performed. As a result, assembly efficiency is low and is far lower than a production requirement.

SUMMARY

This application provides an assembling apparatus to improve assembly efficiency of a battery module.

This application proposes an assembling apparatus configured to assemble a battery module. The battery module includes at least two submodules, and the submodule includes a plurality of battery cells. The assembling apparatus includes a working platform and a support mechanism. The support mechanism is installed on the working platform, and the support mechanism includes a first base, at least two first support assemblies, and a first drive component. The first base is disposed on the working platform. The at least two first support assemblies are spaced apart on the first base along a first horizontal direction and configured to support the submodules. The first drive component is connected to the first support assembly and configured to drive the first support assembly to move along the first horizontal direction, so that at least two of the first support assemblies move close to each other or away from each other.

In the assembling apparatus according to this embodiment of this application, the support mechanism is disposed on the working platform, the support mechanism includes the at least two first support assemblies, the first drive component, and the first base, the first base is disposed on the working platform, and each first support assembly can carry a submodule. When the submodule is placed on the first support assembly, the first drive component drives the first support assembly to move, and adjacent first support assemblies are away from each other, providing space for placing the submodule to prevent interference on the device. During an operation of shaping the battery module, the first drive component drives the submodule on the first support assembly to move. This can avoid relative friction between the submodule and the first support assembly and prevent an external insulating film of the battery cell of the submodule from being damaged due to friction. The assembling apparatus according to this embodiment of this application can implement fully automated production without requiring any manual operation, greatly improving assembly efficiency.

According to an embodiment of this application, the first support assembly includes a first support and a second support. The first support is slidably disposed on the first base and connected to the first drive component. The second support is fixedly disposed on the first support and configured to support the submodule. Both the first support and the second support are configured as separate structures, and are convenient to process and manufacture.

According to an embodiment of this application, the second support is provided with a fastening member. The fastening member is configured to position the submodule.

According to an embodiment of this application, the first drive component includes a first motor and a first connecting piece. The first motor is disposed on the first base. The first connecting piece is connected to the first motor and the first support assembly. The first motor provides a power source for the first support assembly. The first connecting piece is configured to transfer power.

According to an embodiment of this application, the assembling apparatus further includes a first guide rail. The first guide rail is disposed on the working platform and extends along a second horizontal direction, and the first base is slidably disposed on the first guide rail. The first horizontal direction and the second horizontal direction intersect. After the battery module is assembled, the battery module may be moved to a position for a next process. This avoids a case that it is inconducive to material feeding due to interference from other components in this assembly position.

According to an embodiment of this application, the assembling apparatus further includes side-plate positioning mechanisms. The side-plate positioning mechanisms are disposed in pairs on the working platform along the first horizontal direction and configured to position at least two submodules along the first horizontal direction. The side-plate positioning mechanism can perform shaping on the battery module in the first horizontal direction.

According to an embodiment of this application, the assembling apparatus includes a side-plate positioning mechanism. The side-plate positioning mechanism includes: a side guide rail, disposed on the first support assembly and extending along the first horizontal direction; a side connecting piece, slidably disposed on the side guide rail; and a side drive component, connected to the side connecting piece and configured to drive the side connecting piece to move along the first horizontal direction. On the basis that the first support assembly moves along the first horizontal direction, the side connecting piece of the side-plate positioning mechanism further moves along the first horizontal direction. This implements fitting and pressing of a side plate and the battery module and avoids interference on other devices.

According to an embodiment of this application, the assembling apparatus further includes end-plate positioning mechanisms. The end-plate positioning mechanisms are disposed in pairs on the working platform along the second horizontal direction and configured to position at least two submodules along the second horizontal direction. The first horizontal direction and the second horizontal direction intersect. The end-plate positioning mechanism can perform shaping on the battery module along the second horizontal direction.

According to an embodiment of this application, the assembling apparatus includes an end-plate positioning mechanism. The end-plate positioning mechanism includes: an end guide rail, disposed on the working platform and extending along the second horizontal direction; an end connecting piece, slidably disposed on the end guide rail; and an end drive component, connected to the end connecting piece and configured to drive the end connecting piece to move along the second horizontal direction. The end-plate positioning mechanism can move along the second horizontal direction to avoid interference on other devices.

According to an embodiment of this application, the assembling apparatus includes a pressing mechanism. The pressing mechanism is configured to apply pressure to the submodule along a vertical direction. The pressing mechanism can perform shaping on the battery module along the vertical direction.

According to an embodiment of this application, the pressing mechanism includes: two pressing brackets, spaced apart on the working platform along the second horizontal direction, where the first horizontal direction and the second horizontal direction intersect; two pressing guide rails, where each pressing guide rail is disposed on a corresponding pressing bracket and extends along the first horizontal direction; and an electrode pressing assembly, disposed between the two pressing supports and slidably connected to the pressing guide rail, where the electrode pressing assembly is configured to move to the top of the first support assembly along the first horizontal direction and is configured to apply pressure to an electrode terminal of the battery cell along the vertical direction. The pressing mechanism can move along the first horizontal direction to avoid interference on other devices.

According to an embodiment of this application, the electrode pressing assembly includes: an electrode connecting piece; an electrode bracket, slidably connected to the pressing bracket; an electrode guide shaft, where one end of the electrode guide shaft far away from the working platform is slidably disposed on the electrode support, and the other end of the electrode guide shaft facing towards the working platform is fixedly connected to the electrode connecting piece; and a plurality of pressure blocks, where the pressure block is configured to apply pressure to the electrode terminal of the battery cell in the vertical direction, and the plurality of pressure blocks are fixedly disposed on a lower side of the electrode connecting piece and disposed along the second horizontal direction.

According to an embodiment of this application, the pressing mechanism further includes two centering assemblies. The two centering assemblies are spaced apart along the first horizontal direction and configured to apply pressure to the at least two submodules along the first horizontal direction to implement centering correction of the battery module.

According to an embodiment of this application, the battery module further includes a middle separator. The middle separator is disposed between adjacent submodules. The assembling apparatus further includes a middle separator positioning mechanism. The middle separator positioning mechanism is configured to position the middle separator along the vertical direction, so that the middle separator fits the submodule.

According to an embodiment of this application, the middle separator positioning mechanism includes a middle separator bracket, a middle separator connecting piece, and a middle separator guide shaft. The middle separator bracket is disposed on the working platform. The middle separator connecting piece is disposed on the middle separator bracket and extends along the second horizontal direction. The middle separator connecting piece is configured to be connected to the middle separator. The first horizontal direction and the second horizontal direction intersect. One end of the middle separator guide facing towards the working platform is slidably connected to the middle separator bracket, and the other end of the middle separator guide shaft far away from the working platform is fixedly connected to the middle separator connecting piece.

According to an embodiment of this application, the middle separator connecting piece includes a middle separator support, a middle separator guide rail, and two middle separator support seats. The two middle separator support seats are spaced apart along the second horizontal direction. The middle separator support is disposed between the two middle separator support seats and is configured to be connected to the middle separator. The middle separator guide rail is disposed on the middle separator support seat and extends along the vertical direction, and the middle separator guide rail is slidably connected to the middle separator support.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

FIG. 6 is a working flowchart of assembling a battery module by using an assembling apparatus according to an embodiment of this application;

Figure 1:
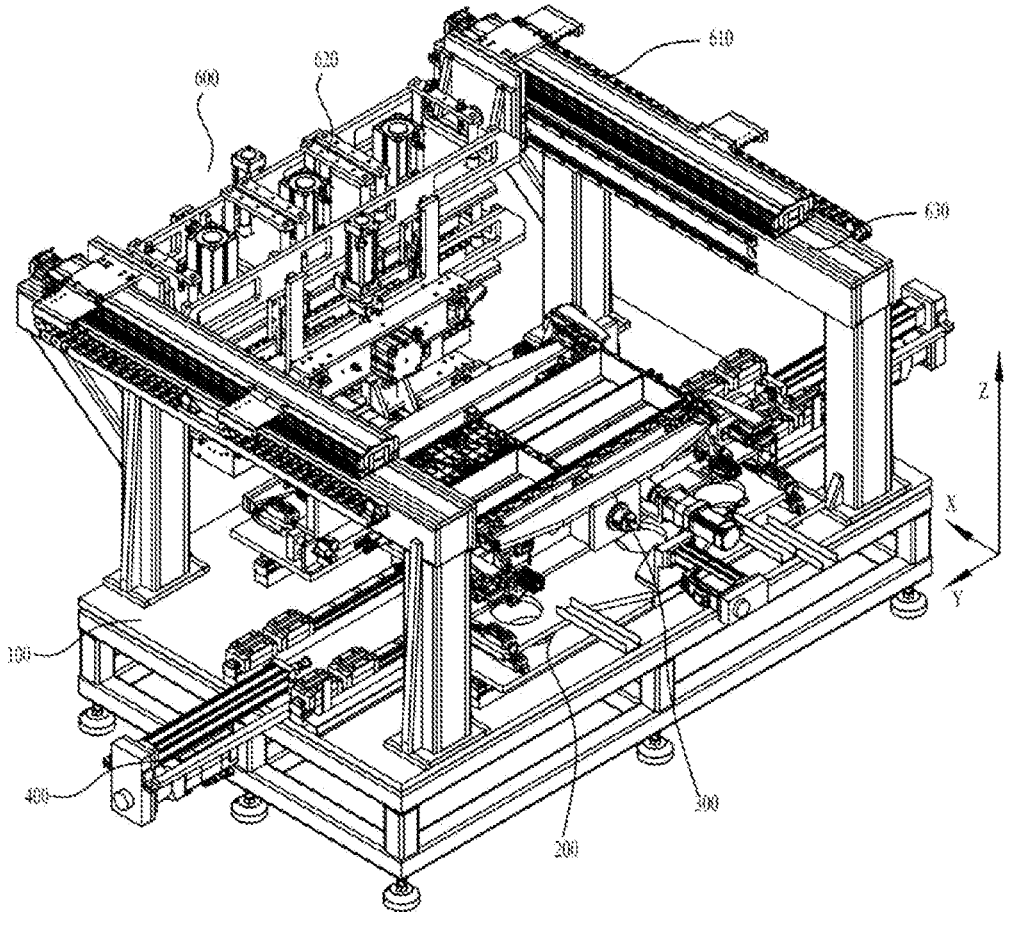
FIG. 1 is a schematic structural diagram of an assembling apparatus according to an embodiment of this application.

In the accompanying drawings, the figures are not necessarily drawn to scale.

The reference signs in the figures:

X: first horizontal direction; Y: second horizontal direction; Z: vertical direction; S: side plate; P: end plate; M: middle separator;

100: working platform;

200: support mechanism; 210: first base; 220: first support assembly; 221: first support; 222: second support; 230: first drive component; 231: first motor; 232: reinforcing piece; 233: first connecting piece; 240: fastening member; 250: first guide rail;

300: side-plate positioning mechanism; 310: side drive component; 320: side connecting piece; 330: side guide rail;

400: end-plate positioning mechanism; 410: end drive component; 420: end connecting piece;

500: middle separator positioning mechanism; 510: middle separator bracket; 520: middle separator guide shaft; 530: middle separator connecting piece; 531: middle separator support; 532: middle separator support seat; 533: middle separator guide rail;

600: pressing mechanism; 610: pressing bracket; 620: electrode pressing assembly; 621: electrode guide shaft; 622: electrode connecting piece; 623: pressure block; 624: electrode bracket; 630: pressing guide rail; 640: centering assembly; and 641: centering plate.

DESCRIPTION OF EMBODIMENTS

The following further describes the embodiments of this application in detail with reference to the accompanying drawings and implementations. The detailed description and accompanying drawings of the following embodiments are used to exemplarily illustrate the principle of this application, but cannot be intended to limit the scope of this application, that is, this application is not limited to the described embodiments.

In the descriptions of this application, it should be noted that, unless otherwise specified, "a plurality of" means two or more; orientations or position relationships indicated by the terms "up". "down". "left", "right", "inside", "outside", and the like are merely intended to facilitate and simplify the descriptions of this application, rather than indicating or implying that an apparatus or a part needs to have a particular direction or needs to be constructed and operated in a particular orientation. Therefore, this shall not be construed as a limitation on this application. In addition, the terms "first", "second", "third", and the like are merely intended for a purpose of description, and shall not be understood as an indication or implication of relative importance. "Vertical" is not strictly vertical, but is within an allowable error range. "Parallel" is not strictly parallel, but is within an allowable error range.

The orientation terms used in the following description all indicate directions shown in the figures and do not limit specific structures in this application. In the descriptions of this application, it should also be noted that, unless otherwise specified and defined explicitly, the terms "installed", "interconnected", and "connected" should be understood broadly, for example, may mean a fixed connection, a detachable connection, or an integral connection, may mean a direct connection, or may mean an indirect connection implemented through an intermediary. A person of ordinary skill in the art can understand specific meanings of these terms in this application based on specific situations.

The applicant notes that increasing a quantity of battery cells can increase energy density of a battery module. There are mainly the following methods for increasing a quantity of battery cells: In a first method, a quantity of battery cells is increased in a length direction. However, this method results in an increase in a length of a battery module. If the battery module is excessively long, overall stiffness of the battery module is poor, and a battery cell in the middle of the battery module easily falls off. In a second method, a quantity of rows of battery cells arranged side by side in a battery module is increased to increase a quantity of battery cells. In this way, energy density of battery modules is increased, and overall space occupied by the battery module is relatively small. However, during assembly of a battery module, battery cells are arranged in a single row, and therefore the battery cells arranged side by side need to get close to each other and shaped. However, in a process of pushing the battery cells, there is friction between the battery cells and a structure used to support the battery cells. As a result, external insulation films of the battery cells are prone to damage.

Based on the above problems found by the applicant, the applicant has improved a structure of an assembling apparatus that is configured to assemble a battery module. The following provides further descriptions of the embodiments of this application.

For better understanding this application, the following describes in detail the embodiments of this application with reference to FIG. 1 to FIG. 11.

A battery module includes at least two submodules, an end plate P, a side plate S, and a middle separator M. Each submodule includes a plurality of battery cells. The plurality of battery cells are arranged in sequence along a second horizontal direction Y. The middle separator M is disposed between adjacent submodules. There are two end plates P, and the end plates P are respectively disposed at two ends of the battery module along the second horizontal direction Y. There are two side plates S and the side plates S are respectively disposed on two sides of the battery module along a first horizontal direction X. The middle separator M, the end plates P, and the side plates S are fixedly connected and form a frame structure. The frame structure accommodates and fastens the battery module. Each battery cell includes an electrode terminal. The electrode terminal usually protrudes from a top surface of the battery cell. The first horizontal direction X and the second horizontal direction Y intersect. For example, the first horizontal direction X is a transverse direction, and the second horizontal direction Y is a longitudinal direction.

An assembling apparatus according to the embodiments of this application is configured to assemble the battery module. Referring to FIG. 1, an embodiment of this application provides an assembling apparatus. The assembling apparatus includes a working platform 100 and a support mechanism 200.

The working platform 100 can provide an installation platform for other mechanisms and has a support function. For example, the working platform 100 may include a mounting base and support legs. The support legs are installed at the bottom of the mounting base. A specific structure of the support leg may be selected based on an actual production situation. For example, the support leg may be a retractable structure to facilitate adjustment of an overall height of the device. For another example, the bottom of the support leg may be connected to a moving component, for example, a roller, to facilitate adjustment of a position of the device. A specific structural form of the working platform 100 is not limited herein.

The support mechanism 200 is installed on the working platform 100 and configured to support the battery module. Specifically, the support mechanism 200 includes a first base 210, at least two first support assemblies 220, and a first drive component 230. The first base 210 serves as an installation base of the first support assembly 220 and supports the first support assembly 220. The at least two first support assemblies 220 each are configured to support a submodule of the battery module and spaced apart on the first base 210 along the first horizontal direction X. Under a driving action of the first drive component 230, adjacent first support assemblies 220 move along the first horizontal direction X, so that submodules respectively supported by the adjacent first support assemblies 220 move close to each other or away from each other.

According to the assembling apparatus in this embodiment of this application, each first support assembly 220 can carry a submodule. When the submodule needs to be placed on the first support assembly 220, the first drive component 230 drives the first support assembly 220 to move, and adjacent first support assemblies 220 move away from each other, providing space for placing the submodule to prevent interference on the device. When a shaping operation needs to be performed on the battery module, the first drive component 230 drives the first support assembly 220 to move, so that the adjacent first support assemblies 220 move close to each other, and the submodules carried on the first support assembly 220 move close to each other, facilitating shaping on at least two submodules. The first drive component 230 drives the submodule on the first support assembly 220 to move. This can avoid relative friction between the submodule and the first support assembly 220 and prevent an insulating film of the submodule from being damaged due to friction.

In this embodiment of this application, an example in which two first support assemblies 220 are disposed is used to describe a working process of the support mechanism 200.

For example, one of the first support assemblies 220 may be used as a reference side, and the first support assembly 220 as the reference side is configured to support one submodule. The first drive component 230 on the reference side does not perform a driving action, or even no first drive component 230 may be provided. The other first support assembly 220 is used as a moving side, and the first support assembly 220 as the moving side is configured to support one submodule. When the submodule needs to be placed on the first support assembly 220, the first drive component 230 on the moving side drives the first support assembly 220 to move towards a side far away from the reference side, so that the first support assembly 220 moves away along the first horizontal direction X. In this way, there is enough space between the first support assembly 220 as the reference side and the first support assembly 220 as the moving side, preventing interference on the device caused when a manipulator is placing a submodule. When the two submodules need to be shaped, the first drive component 230 on the moving side drives the first support assembly 220 to move towards the reference side, so that the two submodules move close to each other in advance along the first horizontal direction X.

For another example, the two first support assemblies 220 each are used as a moving side, and each first support assembly 220 is configured to support one submodule. Under a driving action of the first drive component 230, the two first support assemblies 220 separately move along the first horizontal direction X, so that the two first support assemblies 220 move close to each other or away from each other.

The assembling apparatus according to this embodiment of this application can implement fully automated production without requiring any manual operation, and can greatly improve assembly efficiency.

In some embodiments, the first base 210 and the working platform 100 may be slidably connected or fixedly connected to each other.

The first base 210 is slidably connected to the working platform 100, so that after the battery module is assembled, the battery module may be moved to a position for a next process by moving a position of the entire support mechanism 200. This avoids a case that it is inconducive to material feeding due to interference from other components in this assembly position. Certainly, the first base 210 may alternatively be fixedly connected to the working platform 100, so as to increase stability of the device.

Figure 2:
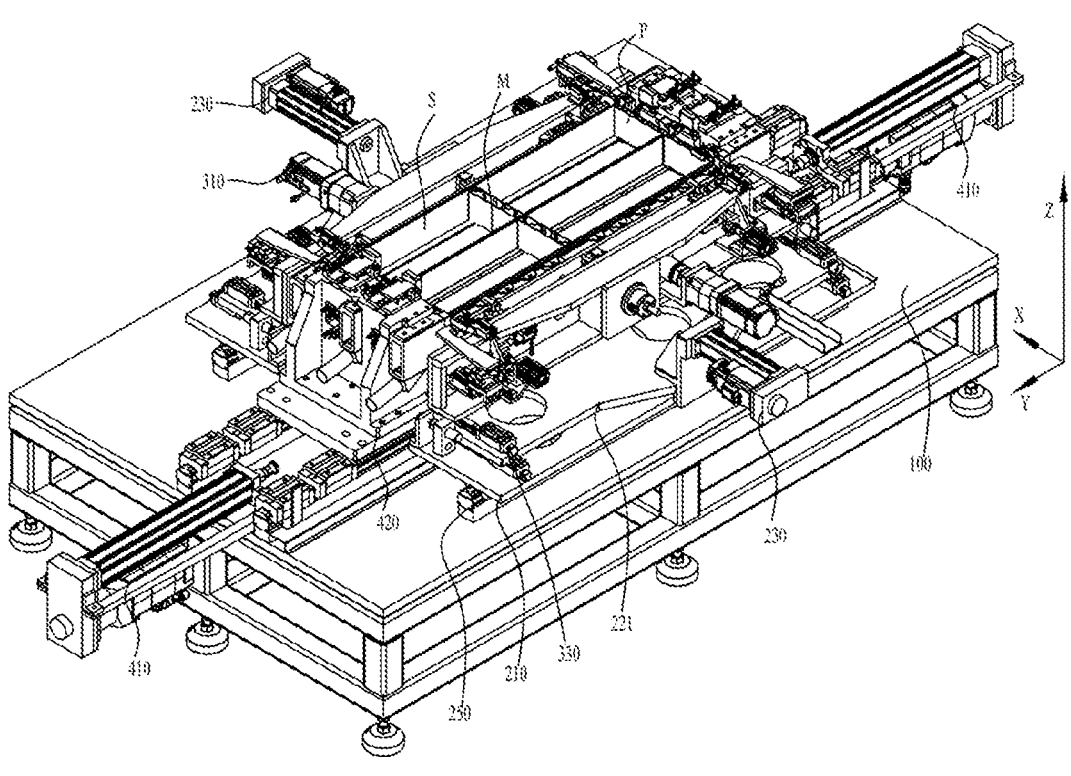
FIG. 2 is a schematic diagram of a partial structure of an assembling apparatus according to an embodiment of this application.

Referring to FIG. 2, for example, a first guide rail 250 is disposed on the working platform 100. The first guide rail 250 may extend along the second horizontal direction Y, and the first base 210 is slidably disposed on the first guide rail 250. By moving the first base 210, the position of the support mechanism 200 can be adjusted along the second horizontal direction Y.

Figure 3:
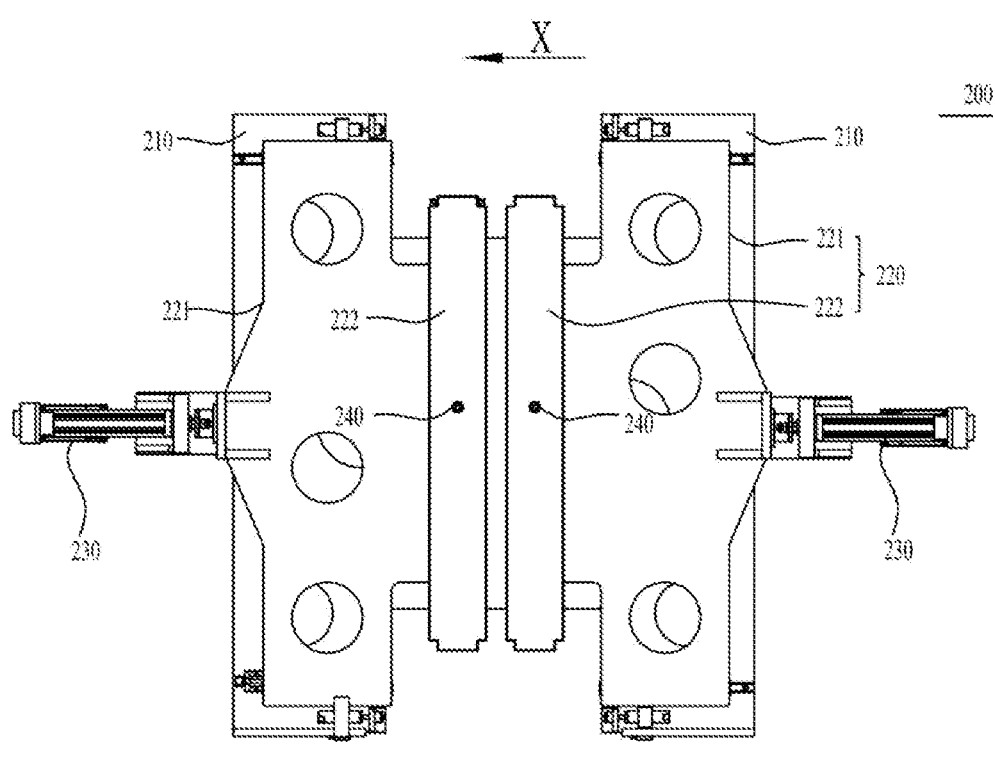
FIG. 3 is a schematic structural vertical view of a support mechanism according to an embodiment of this application.
Figure 4:
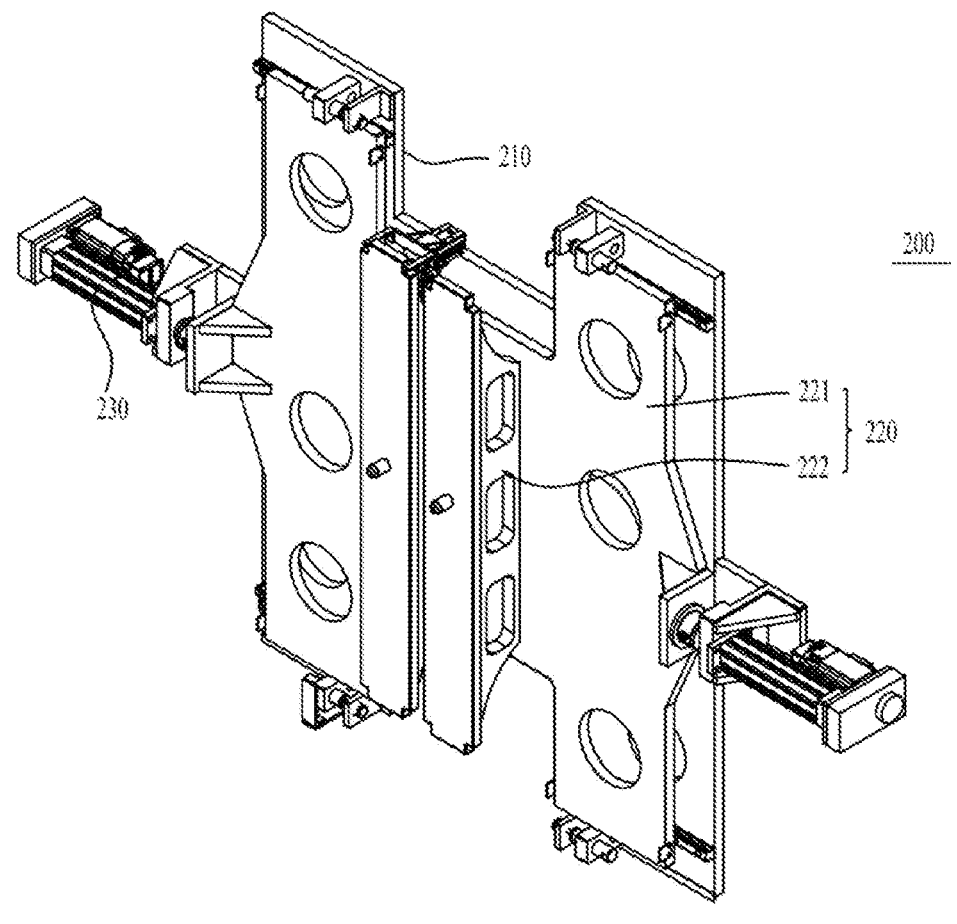
FIG. 4 is a schematic diagram of a three-dimensional structure of a support mechanism according to an embodiment of this application.

Referring to FIG. 3 and FIG. 4, in some embodiments, the first support assembly 220 may include a first support 221 and a second support 222. The first support 221 is slidably disposed on the first base 210 and connected to the first drive component 230. The second support 222 is fixedly disposed on the first support 221 and configured to support the submodule. The first drive component 230 drives the first support 221 to move along the first horizontal direction X, and the first support 221 drives the second support 222 to move together. Both the first support 221 and the second support 222 are configured as separate structures and are convenient to process and manufacture.

According to an embodiment of this application, the second support 222 may be located on one side of the first support 221 far away from the first drive component 230; and there is accommodating space on the other side of the first support 221 close to the first drive component 230, providing space for placing a side-plate positioning mechanism 300. This helps the side-plate positioning mechanism 300 install the side plate S of the battery module, avoiding interference on the device.

Figure 5:
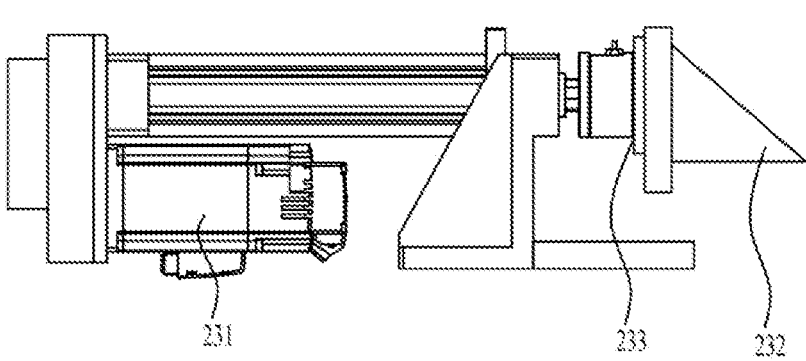
FIG. 5 is a schematic structural diagram of a first drive component according to an embodiment of this application.

Referring to FIG. 5, in some embodiments, the first drive component 230 may include a first motor 231 and a first connecting piece 233. The first motor 231 may be disposed on the first base 210, and the first motor 231 provides a power source for the first support assembly 220. The first connecting piece 233 is connected to the first motor 231 and the first support assembly 220, and the first connecting piece 233 is configured to transfer power. The first motor 231 may be a control motor, for example, a stepper motor or a servo motor, so as to improve accuracy of driving displacement, strictly control a moving distance of the submodule, and improve shaping accuracy of the battery module. Under a precise driving action of the control motor, a driving distance can be accurately controlled based on a submodule specification, so that the submodules are centered and close to each other, thereby accurately completing assembly of the battery module.

To improve stability of the first support assembly 220, a reinforcing piece 232 may further be disposed on the first support assembly 220. The reinforcing piece 232 may be connected to the first connecting piece 233 to further transmit power. The reinforcing piece 232 may be configured in a form of a reinforcing rib. Reinforcing ribs are disposed in pairs on the first support assembly 220.

In some embodiments, a fastening member 240 may be disposed on the second support 222. The fastening member 240 is configured to accurately position the submodule and improve stability of supporting the submodule by the second support 222. The fastening member 240 may be configured in a form of a positioning pin or a positioning plate, and a specific structural form of the fastening member 240 is not limited herein. Corresponding to the configuration form of the fastening member 240, a corresponding fitting structure may be disposed in the submodule. For example, the fastening member 240 is a positioning pin, and a fitting positioning hole is disposed in the submodule. The positioning pin fits the positioning hole to implement accurate positioning of the submodule.

According to an embodiment of this application, the first support 221, the second support 222, and the first base 210 each may be provided with a plurality of through holes to reduce an overall weight of the device.

According to an embodiment of this application, the support mechanism 200 performs pre-shaping on the battery module along the first horizontal direction X. On this basis, shaping may be performed on the battery module along the first horizontal direction X, the second horizontal direction Y, and a vertical direction Z.

Referring to FIG. 6, a working process of assembling a battery module by using an assembling apparatus is as follows.

S100: A support mechanism 200 drives at least two submodules of the battery module to move close to each other in advance with a gap between adjacent submodules.

S200: A middle separator positioning mechanism 500 drives a middle separator M to pre-fit the submodule, where the middle separator M is located in the gap.

S300: An end-plate positioning mechanism 400 drives an end plate P to move along a second horizontal direction Y to pre-press the end plate P and two ends of the battery module.

S400: A pressing mechanism 600 applies pressure to the battery module along a vertical direction Z to implement positioning of the battery module in the vertical direction Z.

S500: The support mechanism 200 drives the submodules to move closer along a first horizontal direction X to implement fitting of each submodule with the middle separator M.

S600: A centering assembly 640 in the pressing mechanism 600 performs centering correction on the battery module along the first horizontal direction X.

S700: A side-plate positioning mechanism 300 drives a side plate S to move along the first horizontal direction X to implement fitting and pressing of the side plate S and two sides of the battery module to complete assembly of the battery module.

The following describes specific structures of the side-plate positioning mechanism 300, the end-plate positioning mechanism 400, the middle separator positioning mechanism 500, and the pressing mechanism 600.

Figure 7:
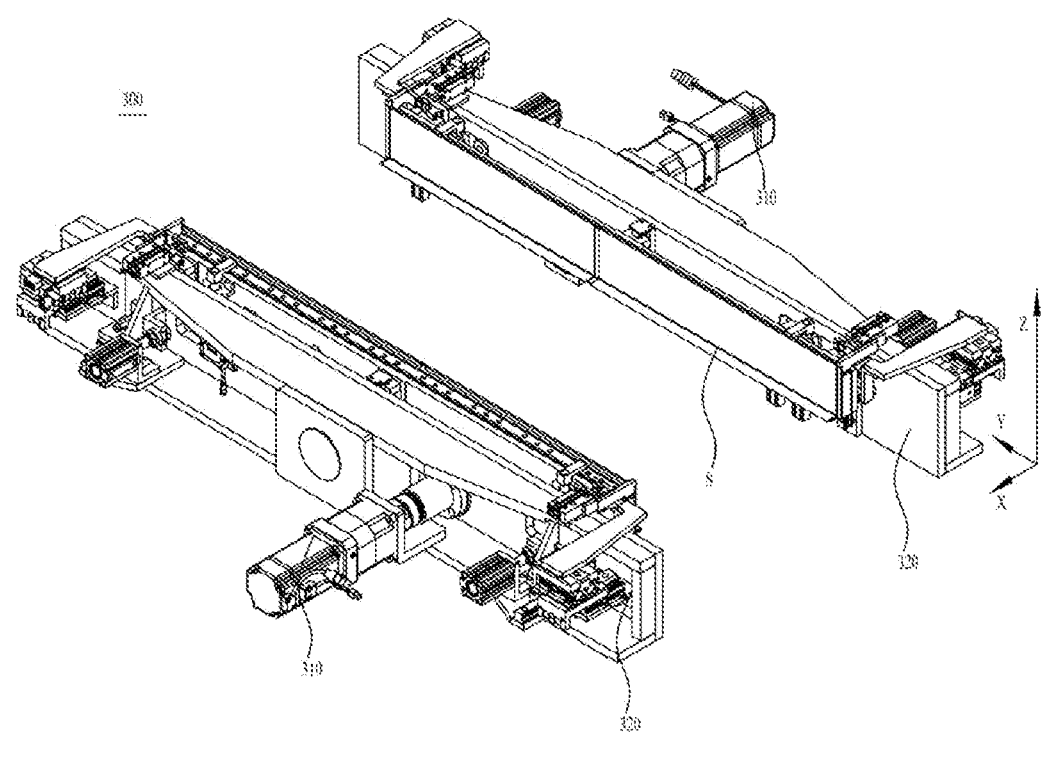
FIG. 7 is a schematic structural diagram of side-plate positioning mechanisms disposed in pairs according to an embodiment of this application.

Referring to FIG. 2 and FIG. 7, the side-plate positioning mechanism 300 is configured to position at least two submodules along the first horizontal direction X. Side-plate positioning mechanisms 300 are disposed in pairs on a working platform 100 along the first horizontal direction X. During positioning, one of the side-plate positioning mechanisms 300 may be used as a reference side, and the other side-plate positioning mechanism 300 may be used as a moving side. The side-plate positioning mechanism 300 as the moving side moves towards or away from the side-plate positioning mechanism 300 as the reference side along the first horizontal direction X. Alternatively, the two side-plate positioning mechanisms 300 each may be used as a moving side, and the two side-plate positioning mechanisms 300 may move close to each other or away from each other along the first horizontal direction X.

For example, the side-plate positioning mechanism 300 may include a side guide rail 330, a side connecting piece 320, and a side drive component 310. The side guide rail 330 is disposed on a first support assembly 220, for example, on a first support 221 of the first support assembly 220. The side guide rail 330 extends along the first horizontal direction X. The side connecting piece 320 is slidably disposed on the side guide rail 330, and the side connecting piece 320 is connected to the side plate S. The side drive component 310 is connected to the side connecting piece 320. On the basis that the first support assembly 220 moves along the first horizontal direction X, the side connecting piece 320 in the side-plate positioning mechanism 300 further moves along the first horizontal direction X to implement fitting and pressing of the side plate S and the battery module. The side drive component 310 may be a control motor and a transmission shaft. The transmission shaft is connected to the control motor and the side connecting piece 320. The control motor can accurately control a moving distance of the side connecting piece 320 to ensure accuracy of fitting between the side plate S and the battery module. The control motor may be a stepper motor, a servo motor, or the like.

Referring to FIG. 2, the end-plate positioning mechanism 400 is configured to position at least two submodules along the second horizontal direction Y. End-plate positioning mechanisms 400 are disposed in pairs on the working platform 100 along the second horizontal direction Y. During positioning, one of the end-plate positioning mechanisms 400 may be used as a reference side, and the other end-plate positioning mechanism 400 may be used as a moving side. The end-plate positioning mechanism 400 as the moving side moves towards or away from the end-plate positioning mechanism 400 as the reference side along the second horizontal direction Y. Alternatively, the two end-plate positioning mechanisms 400 each may be used as a moving side, and the two end-plate positioning mechanisms 400 may move close to each other or away from each other along the second horizontal direction Y.

For example, the end-plate positioning mechanism 400 may include an end guide rail, an end connecting piece 420, and an end drive component 410. The end guide rail is disposed on the working platform 100, and the end guide rail extends along the second horizontal direction Y. The end connecting piece 420 is slidably disposed on the end guide rail, and the end connecting piece 420 is connected to the end plate P. The end drive component 410 is connected to the end connecting piece 420. Driven by the end drive component 410, the end connecting piece 420 moves along the second horizontal direction Y to implement fitting and pressing of the end plate P and the battery module. The end drive component 410 may be a control motor and a transmission shaft. The transmission shaft is connected to the control motor and the end connecting piece 420. The control motor can accurately control a moving distance of the end connecting piece 420 to ensure accuracy of fitting between the end plate P and the battery module. The control motor may be a stepper motor, a servo motor, or the like.

Figure 8:
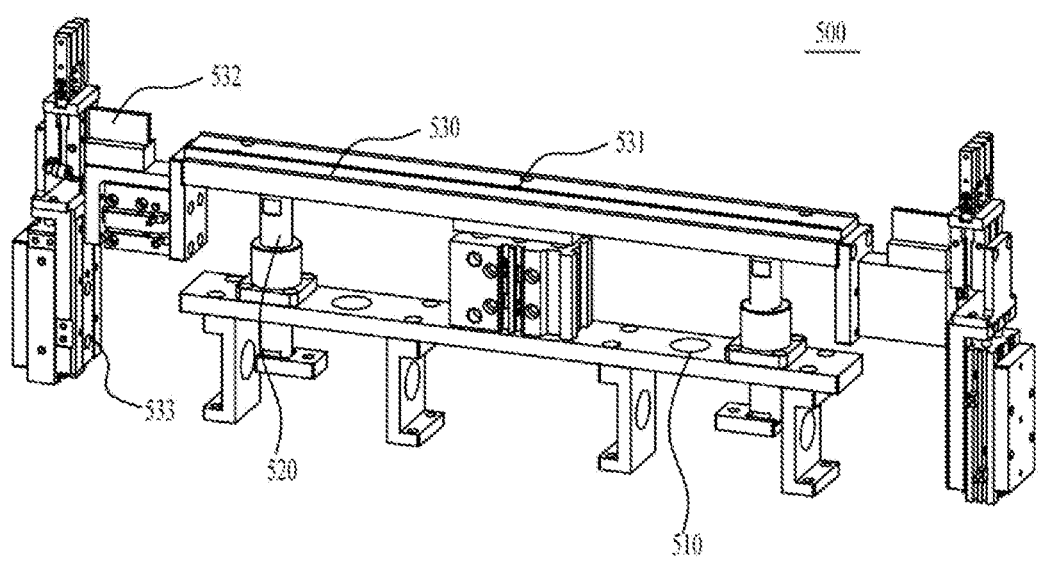
FIG. 8 is a schematic structural diagram of a middle separator positioning mechanism according to an embodiment of this application.
Figure 9:
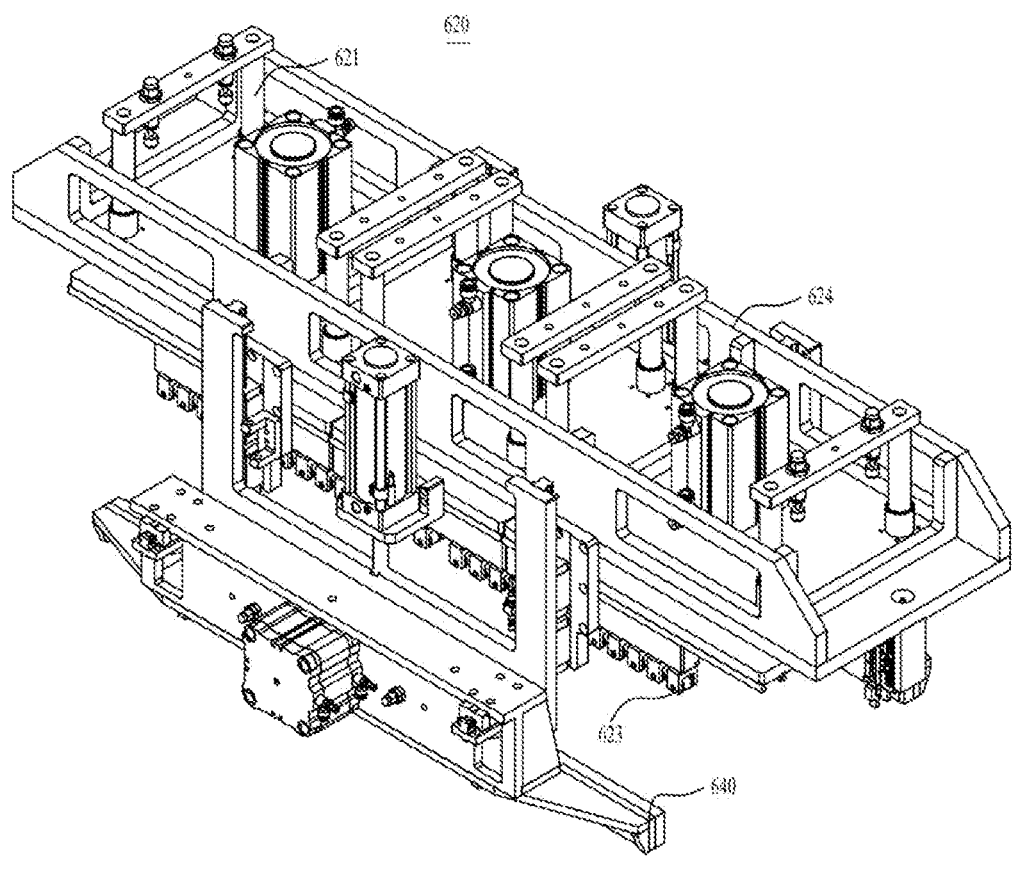
FIG. 9 is a first schematic diagram of a three-dimensional structure of an electrode pressing assembly according to an embodiment of this application.
Figure 10:
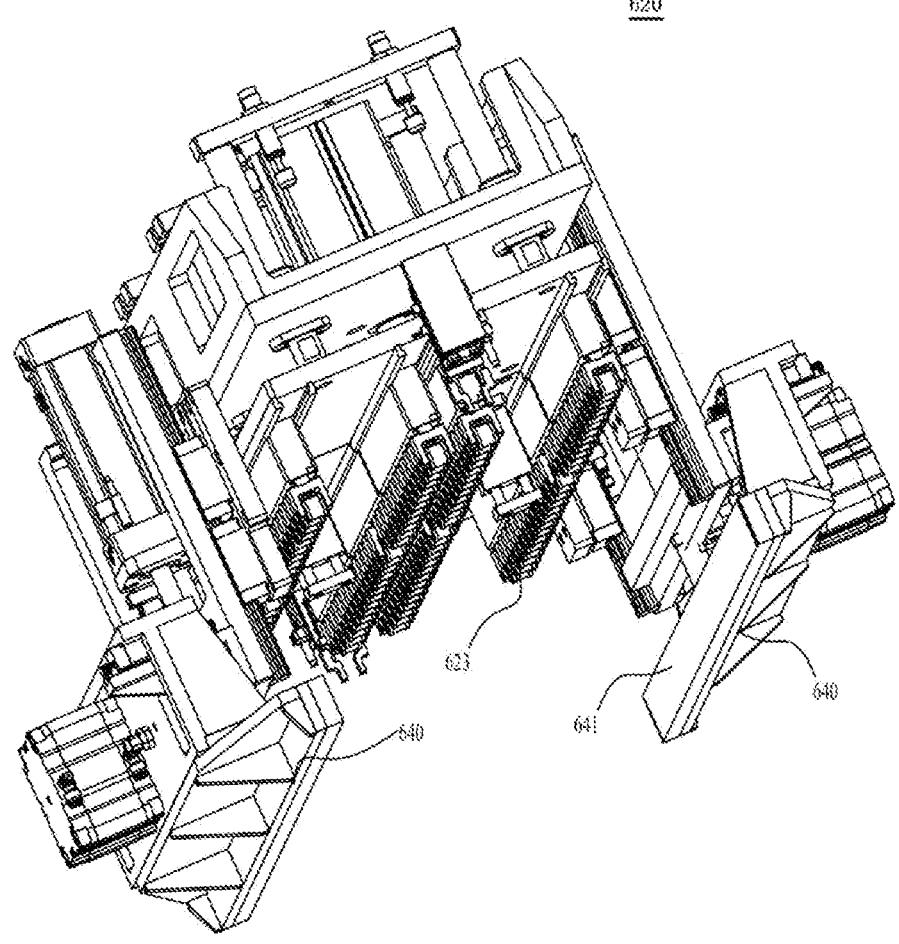
FIG. 10 is a second schematic diagram of a three-dimensional structure of an electrode pressing assembly according to an embodiment of this application.
Figure 11:
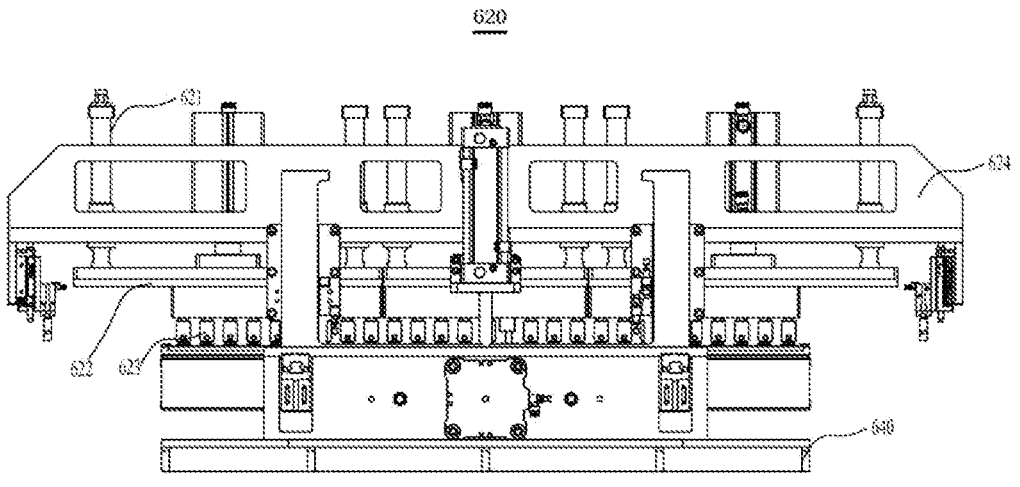
FIG. 11 is a schematic front view of a structure of an electrode pressing assembly according to an embodiment of this application.

Referring to FIG. 2 and FIG. 8, the middle separator positioning mechanism 500 is configured to position the middle separator M along the vertical direction Z to implement fitting of the middle separator M and the submodule.

For example, the middle separator positioning mechanism 500 may be disposed on a lower side of the support mechanism 200. Before step S200 is performed, the middle separator M is located on the lower side of the support mechanism 200 and does not cause interference on placement or closeness of each submodule in step S100. In S200, the middle separator positioning mechanism 500 drives the middle separator M to pre-fit the submodule in the gap between the adjacent submodules.

The middle separator positioning mechanism 500 may include a middle separator bracket 510, a middle separator connecting piece 530, and a middle separator guide shaft 520. The middle separator bracket 510 is disposed on the working platform 100. The middle separator connecting piece 530 is disposed on the middle separator bracket 510 and extends along the second horizontal direction Y. The middle separator connecting piece 530 is connected to the middle separator M. One end of the middle separator guide shaft 520 facing towards the working platform 100 is slidably connected to the middle separator bracket 510, and the other end of the middle separator guide shaft 520 far away from the working platform 100 is fixedly connected to the middle separator connecting piece 530.

Specifically, the middle separator connecting piece 530 may include a middle separator support 531, a middle separator guide rail 533, and two middle separator support seats 532. The two middle separator support seats 532 are spaced apart along the second horizontal direction Y. The middle separator support 531 is disposed between the two middle separator support seats 532 and configured to be connected to the middle separator M. The middle separator guide rail 533 is disposed on the middle separator support seat 532 and extends along the vertical direction Z. The middle separator guide rail 533 is slidably connected to the middle separator support 531.

Referring to FIG. 1 and FIG. 9 to FIG. 11, the pressing mechanism 600 may be configured to apply pressure to the submodule along the vertical direction Z to implement positioning of an electrode terminal of a battery cell along the vertical direction Z.

For example, the pressing mechanism 600 may include two pressing brackets 610, two pressing guide rails 630, and an electrode pressing assembly 620. The two pressing brackets 610 are spaced apart on the working platform 100 along the second horizontal direction Y. Each pressing guide rail 630 is disposed on a corresponding pressing bracket 610 and extends along the first horizontal direction X. The electrode pressing assembly 620 is disposed between the two pressing brackets 610 and slidably connected to the pressing guide rail 630. The electrode pressing assembly 620 is configured to move to the top of the first support assembly 220 along the first horizontal direction X and is configured to apply pressure to the electrode terminal of the battery cell along the vertical direction Z. According to an embodiment of this application, the pressing mechanism 600 does not cause interference on other devices.

In step S400, the electrode pressing assembly 620 moves to the top of the support mechanism 200 along the pressing guide rail 630, and then applies pressure to the electrode terminal along the vertical direction Z to position the electrode terminal of the battery module along the vertical direction Z.

Specifically, the electrode pressing assembly 620 may include an electrode connecting piece 622, an electrode bracket 624, an electrode guide shaft 621, and a plurality of pressure blocks 623. The electrode bracket 624 is slidably connected to the pressing bracket 610. One end of the electrode guide shaft 621 far away from the working platform 100 is slidably disposed on the electrode bracket 624. The other end of the electrode guide shaft 621 facing towards the working platform 100 is fixedly connected to the electrode connecting piece 622. The plurality of pressure blocks 623 are fixedly disposed on a lower side of the electrode connecting piece 622 and disposed along the second horizontal direction Y, and the plurality of pressure blocks 623 are configured to apply pressure to the electrode terminal of the battery cell along the vertical direction Z.

Specifically, the pressing mechanism 600 may further include two centering assemblies 640. The two centering assemblies 640 are spaced apart along the first horizontal direction X and configured to apply pressure to at least two submodules of the battery module along the first horizontal direction X. The centering assembly 640 may be installed at the bottom of the electrode bracket 624. For example, the centering assembly 640 may include a drive component and a centering plate 641. The drive component and the centering plate 641 are installed at the bottom of the electrode bracket 624. Centering plates 641 of the two centering assemblies 640 are disposed opposite to each other along the first horizontal direction X, and the drive component drives the centering plate 641 to move along the first horizontal direction X to implement centering correction of the battery module.

According to this embodiment of this application, the mechanisms are disposed at different positions on the working platform 100, and the side-plate positioning mechanism 300, the end-plate positioning mechanism 400, the middle separator positioning mechanism 500, and the pressing mechanism 600 cooperate with each other. This implements assembly and shaping of the at least two submodules and can avoid interference between the mechanisms.

Although this application has been described with reference to preferred embodiments, various improvements can be made to this application and the components therein can be replaced with equivalents without departing from the scope of this application. In particular, various technical features mentioned in the embodiments can be combined in any manner provided that there is no structural conflict. This application is not limited to the specific embodiments disclosed in this specification, but includes all technical solutions falling within the scope of the claims.

The invention claimed is:

1. An assembling apparatus, configured to assemble a battery module, wherein the battery module comprises at least two submodules, the submodule comprises a plurality of battery cells, and the assembling apparatus comprises a working platform, a plurality of side-plate positioning mechanisms, and a support mechanism, wherein the support mechanism comprises:

a first base, disposed on the working platform;

at least two first support assemblies, spaced apart on the first base along a first horizontal direction and configured to support the submodules; and a first drive component, wherein the first drive component is connected to the first support assembly and configured to drive the first support assembly to move along the first horizontal direction, so that at least two of the first support assemblies move close to each other or away from each other, wherein the plurality of side-plate positioning mechanisms are disposed in pairs on the working platform along the first horizontal direction and configured to position the at least two submodules along the first horizontal direction.

2. The assembling apparatus according to claim 1, wherein the first support assembly comprises:

a first support, slidably disposed on the first base and connected to the first drive component; and a second support, fixedly disposed on the first support and configured to support the submodule.

3. The assembling apparatus according to claim 2, wherein the second support is provided with a fastening member, and the fastening member is configured to position the submodule.

4. The assembling apparatus according to claim 1, wherein the first drive component comprises:

a first motor, disposed on the first base; and a first connecting piece, wherein the first connecting piece is connected to the first motor and the first support assembly.

5. The assembling apparatus according to claim 1, wherein the assembling apparatus further comprises a first guide rail, the first guide rail is disposed on the working platform and extends along a second horizontal direction, and the first base is slidably disposed on the first guide rail, wherein the first horizontal direction and the second horizontal direction intersect.

6. The assembling apparatus according to claim 1, wherein the assembling apparatus further comprises:

a plurality of end-plate positioning mechanisms, wherein the plurality of end-plate positioning mechanisms are disposed in pairs on the working platform along a second horizontal direction and configured to position the at least two submodules along the second horizontal direction, wherein the first horizontal direction and the second horizontal direction intersect.

7. The assembling apparatus according to claim 1, wherein each side-plate positioning mechanism of the plurality of side-plate positioning mechanisms comprises:

a side guide rail, disposed on the first support assembly and extending along the first horizontal direction;

a side connecting piece, slidably disposed on the side guide rail; and a side drive component, connected to the side connecting piece and configured to drive the side connecting piece to move along the first horizontal direction.

8. The assembling apparatus according to claim 6, wherein each end-plate positioning mechanism of the plurality of end-plate positioning mechanisms comprises:

an end guide rail, disposed on the working platform and extending along the second horizontal direction;

an end connecting piece, slidably disposed on the end guide rail; and an end drive component, connected to the end connecting piece and configured to drive the end connecting piece to move along the second horizontal direction.

9. The assembling apparatus according to claim 1, wherein the assembling apparatus comprises a pressing mechanism, and the pressing mechanism is configured to apply pressure to the submodule in a vertical direction.

10. The assembling apparatus according to claim 9, wherein the pressing mechanism comprises:

two pressing brackets, spaced apart on the working platform along a second horizontal direction, wherein the first horizontal direction and the second horizontal direction intersect;

two pressing guide rails, wherein the pressing guide rail is disposed on a corresponding pressing bracket and extends along the first horizontal direction; and an electrode pressing assembly, disposed between the two pressing brackets and slidably connected to the pressing guide rail, wherein the electrode pressing assembly is configured to move to a top of the first support assembly along the first horizontal direction and is configured to apply pressure to an electrode terminal of the battery cell along the vertical direction.

11. The assembling apparatus according to claim 10, wherein the electrode pressing assembly comprises:

an electrode connecting piece;

an electrode bracket, slidably connected to the pressing bracket;

an electrode guide shaft, wherein one end of the electrode guide shaft far away from the working platform is slidably disposed on the electrode bracket, and the other end of the electrode guide shaft facing towards the working platform is fixedly connected to the electrode connecting piece; and a plurality of pressure blocks, wherein the pressure block is configured to apply pressure to the electrode terminal of the battery cell along the vertical direction, and the plurality of pressure blocks are fixedly disposed on a lower side of the electrode connecting piece and disposed along the second horizontal direction.

12. The assembling apparatus according to claim 9, wherein the pressing mechanism further comprises two centering assemblies, and the two centering assemblies are spaced apart along the first horizontal direction and configured to apply pressure to the at least two submodules along the first horizontal direction.

13. The assembling apparatus according to claim 1, wherein the battery module further comprises a middle separator, and the middle separator is disposed between adjacent submodules; and the assembling apparatus further comprises a middle separator positioning mechanism, wherein the middle separator positioning mechanism is configured to position the middle separator along a vertical direction, so that the middle separator fits the submodule.

14. The assembling apparatus according to claim 13, wherein the middle separator positioning mechanism comprises:

a middle separator bracket, wherein the middle separator bracket is disposed on the working platform;

a middle separator connecting piece, wherein the middle separator connecting piece is disposed on the middle separator bracket and extends along a second horizontal direction, the middle separator connecting piece is configured to be connected to the middle separator, and the first horizontal direction and the second horizontal direction intersect; and a middle separator guide shaft, wherein one end of the middle separator guide shaft facing towards the working platform is slidably connected to the middle separator bracket, and the other end of the middle separator guide shaft far away from the working platform is fixedly connected to the middle separator connecting piece.

15. The assembling apparatus according to claim 14, wherein the middle separator connecting piece comprises:

two middle separator support seats, wherein the two middle separator support seats are spaced apart along the second horizontal direction;

a middle separator support, wherein the middle separator support is disposed between the two middle separator support seats and configured to be connected to the middle separator; and a middle separator guide rail, wherein the middle separator guide rail is disposed on the middle separator support seat and extends along the vertical direction, and the middle separator guide rail is slidably connected to the middle separator support.

16. An assembling apparatus, configured to assemble a battery module, wherein the battery module comprises at least two submodules, the submodule comprises a plurality of battery cells, and the assembling apparatus comprises a working platform, a plurality of end-plate positioning mechanisms, and a support mechanism, wherein the support mechanism comprises:

a first base, disposed on the working platform;

at least two first support assemblies, spaced apart on the first base along a first horizontal direction and configured to support the submodules; and a first drive component, wherein the first drive component is connected to the first support assembly and configured to drive the first support assembly to move along the first horizontal direction, so that at least two of the first support assemblies move close to each other or away from each other, wherein the plurality of end-plate positioning mechanisms are disposed in pairs on the working platform along a second horizontal direction and configured to position the at least two submodules along the second horizontal direction, wherein the first horizontal direction and the second horizontal direction intersect.

17. The assembling apparatus according to claim 16, wherein the assembling apparatus further comprises a plurality of side-plate positioning mechanisms, wherein the plurality of side-plate positioning mechanisms are disposed in pairs on the working platform along the first horizontal direction and configured to position at least two submodules along the first horizontal direction.

18. An assembling apparatus, configured to assemble a battery module, wherein the battery module comprises at least two submodules and a middle separator disposed between adjacent submodules, the submodule comprises a plurality of battery cells, and the assembling apparatus comprises a working platform, a middle separator positioning mechanism, and a support mechanism, wherein the support mechanism comprises:

a first base, disposed on the working platform;

at least two first support assemblies, spaced apart on the first base along a first horizontal direction and configured to support the submodules; and a first drive component, wherein the first drive component is connected to the first support assembly and configured to drive the first support assembly to move along the first horizontal direction, so that at least two of the first support assemblies move close to each other or away from each other, wherein the middle separator positioning mechanism comprises a middle separator bracket is disposed on the working platform, the middle separator positioning mechanism is configured to position the middle separator along a vertical direction, so that the middle separator fits the submodule, the a middle separator bracket, wherein the middle separator bracket is disposed on the working platform.

19. The assembling apparatus according to claim 18, wherein the middle separator positioning mechanism further comprises:

a middle separator connecting piece, wherein the middle separator connecting piece is disposed on the middle separator bracket and extends along a second horizontal direction, the middle separator connecting piece is configured to be connected to the middle separator, and the first horizontal direction and the second horizontal direction intersect; and a middle separator guide shaft, wherein one end of the middle separator guide shaft facing towards the working platform is slidably connected to the middle separator bracket, and the other end of the middle separator guide shaft far away from the working platform is fixedly connected to the middle separator connecting piece.

20. The assembling apparatus according to claim 19, wherein the middle separator connecting piece further comprises:

two middle separator support seats, wherein the two middle separator support seats are spaced apart along the second horizontal direction;

a middle separator support, wherein the middle separator support is disposed between the two middle separator support seats and configured to be connected to the middle separator; and a middle separator guide rail, wherein the middle separator guide rail is disposed on the middle separator support seat and extends along the vertical direction, and the middle separator guide rail is slidably connected to the middle separator support.

* * * * *